United States Patent [19]

Inagaki

[11] Patent Number: 4,987,298
[45] Date of Patent: Jan. 22, 1991

[54] AUTOMATIC GAIN CONTROL APPARATUS WHICH ADJUSTS BIAS AND GAIN TO MAXIMIZE SIGNAL TO NOISE RATIO

[75] Inventor: Yoshio Inagaki, Kanagawa, Japan

[73] Assignee: Kabushiki Kaisha Toshiba, Kawasaki, Japan

[21] Appl. No.: 446,662

[22] Filed: Dec. 6, 1989

[30] Foreign Application Priority Data

Feb. 9, 1989 [JP] Japan .................................. 1/28579

[51] Int. Cl.$^5$ ............................................. H01J 40/14
[52] U.S. Cl. .......................... 250/214 AG; 250/214 C
[58] Field of Search ....... 250/214 AG, 214 A, 214 C, 250/238; 455/619, 601; 307/311, 269, 359, 358, 264, 310, 360; 330/278, 279, 282, 284, 285, 127; 374/132, 133

[56] References Cited

U.S. PATENT DOCUMENTS

| 4,019,048 | 4/1977 | Maione et al. | 455/608 |
| 4,292,514 | 9/1981 | Ohtomo | 250/238 |
| 4,298,835 | 11/1981 | Rowe | 307/310 |
| 4,438,348 | 3/1984 | Casper et al. | 250/238 |
| 4,467,192 | 8/1984 | Velo | 250/214 AG |
| 4,495,410 | 1/1985 | Minami et al. | 307/360 |
| 4,599,527 | 7/1986 | Beaudet et al. | 250/214 AG |
| 4,644,145 | 2/1987 | Gündner | 455/619 |
| 4,665,311 | 5/1987 | Cole | 250/214 AG |
| 4,730,128 | 3/1988 | Seki | 307/310 |

*Primary Examiner*—David C. Nelms
*Assistant Examiner*—Michael Messinger
*Attorney, Agent, or Firm*—Cushman, Darby & Cushman

[57] ABSTRACT

An automatic gain control apparatus includes an optical receiving element. The optical receiving element generates electrical signals with an adjustable multiplication factor. A variable gain controller amplifies the electrical signals with an adjustable gain. A comparator generates determined signals corresponding to the difference between levels of an amplified signal from the gain controller and a predetermined signal. A comparator controls the gain of the controller. Also, bias signals are produced for setting the multiplication factor to first and second defined values.

8 Claims, 4 Drawing Sheets

AUTOMATIC GAIN CONTROL APPARATUS WHICH ADJUSTS BIAS AND GAIN TO MAXIMIZE SIGNAL TO NOISE RATIO

BACKGROUND OF THE INVENTION

1. Field of the Invention

This invention relates to an apparatus for controlling a multiplication factor of an optical receiving means and controlling a gain of amplifying means for electrical signals corresponding to the received optical signals. More specifically, the invention relates to an automatic multiplication factor and gain control apparatus which has application in a repeater for an optical signal transmission apparatus, etc.

2. Description of the Related Art

In an optical receiving system, such as an optical repeater etc. which are used in an optical communication apparatus, a photoelectric converting circuit having an optical receiving element, such as an avalanche photodiode, has been used. An automatic gain control apparatus is used for transmitting a received optical signal without deteriorated amplitude. The apparatus controls the multiplication factor of the optical receiving element and the gain of a circuit for amplifying electrical signals corresponding to the received optical signals.

As shown in FIG. 6, a well-known apparatus has an optical receiving element 51, such as an avalanche photodiode (APD), which converts and amplifies received optical signals into electrical signals with an adjustable multiplication factor. The multiplication factor of optical receiving element 51 is controlled by a change of a bias signal applied thereto. A variable gain amplifier 52 amplifies the converted electrical signals from optical receiving element 51. The amplified signals from variable gain amplifier 52 are transmitted to a transmitting system and are also supplied to a peak detector 53 which detects peak levels of the amplified signals. A comparator 54 compares an output voltage corresponding to the peak level with a predetermined voltage corresponding to the peak level with a predetermined voltage from a voltage source 55. When the output voltage from peak detector 53 is less than the predetermined voltage, a voltage control circuit 56 generates a bias voltage having a level corresponding to an output signal from comparator 54. The multiplication factor of optical receiving element 51 is controlled by this bias voltage. The output signal from comparator 54 also controls the gain of amplifier 52. By appropriate control of the multiplication factor element 51 and the gain of amplifier 52, an output amplitude from amplifier 52 is kept constant regardless of optical input levels in optical receiving element 51. When the received optical signal has a low level corresponding to the output voltage from peak detector 54, which is lower than the predetermined voltage, the gain of variable gain amplifier 52 is controlled to be constant by a control signal from comparator 54. When the level of the optical signal changes, the output amplitude from amplifier 52 is usually controlled to be constant by changing the multiplication factor of optical receiving element 51. However, when the received optical signal has a high level, as determined by the output voltage from peak detector 54 being greater than the predetermined voltage, the output amplitude from amplifier 52 is kept constant by changing the gain of amplifier 52 without changing of the multiplication factor of element 51.

In FIG. 7, a continuous line shows a relation between the level of the received optical signal and the multiplication factor in the optical receiving element. A dashed line shows a relation between the level of the received optical signal in the optical receiving element and the gain of the variable gain amplifier. As shown in FIG. 7, when the level of the received optical signal is low, the gain is constant. As the level of the received optical signal rises, the multiplication factor becomes lower and eventually stabilizes at a constant minimum level. Also, the gain becomes low. Then, the output amplitude from variable gain amplifier 52 is kept constant.

Optical receiving element 51, when embodied as an avalanche photodiode, generates noise with its value dependent on the multiplication factor. Also, the avalanche photodiode has an optimum multiplication factor in which a signal to noise ratio becomes maximum. FIG. 8 shows a relation between the level of the received optical signal and the signal to noise ratio, in a receiving system of an optical repeater, which depends on ways of controlling of the multiplication factor. A continuous line shows a case in which the multiplication factor is controlled so that the signal to noise ratio becomes maximum. A dashed line shows a case in which the multiplication factor is kept constant. A chain line shows a case in which the multiplication factor is controlled and variable. As shown in FIG. 8, when the level of the received optical signal increases, the signal to noise ratio in the constant multiplication factor is better than that in the variable multiplication factor. However, when the multiplication factor is kept constant, a dynamic range of the level of the received optical signal is restricted and deteriorates. Thus, it is difficult to secure a constant output amplitude from the variable gain amplifier with a wide dynamic range of the received optical signals.

SUMMARY OF THE INVENTION

It is an object of the present invention to improve a signal to noise ratio in an optical receiving system.

It is a further object of the present invention to prevent the deterioration of a dynamic range of a received optical signal.

It is still a further object of the present invention to keep an output amplitude from variable gain amplifier constantly.

To achieve the above objects and in accordance with the purpose of the invention, as embodied and broadly described herein, the invention provides an apparatus for automatically controlling gain. Optical signals are received by an optical receiving element. The receiving element generates electrical signals corresponding to the received optical signals. The receiving element has an adjustable multiplication factor which depends on an applied bias signal. A variable gain controller amplifies the electrical signals from the receiving element by an adjustable gain. A comparator generates determined signals corresponding to the difference between the amplified electrical signals from the gain controller and a predetermined signal. Also, the comparator controls a gain of the controller by the determined signals. In response to the determined signals, the bias signal is produced for setting the multiplication factor to a first value when a value of the determined signal is less than a first predetermined value, and for setting the multiplication factor to a second value when a value of the determined signal is greater than a second predetermined value.

BRIEF DESCRIPTION OF THE DRAWINGS

The present invention is best understood with reference to the accompanying drawings in which.

DETAILED DESCRIPTION OF THE PREFERRED EMBODIMENT

Figure 1:
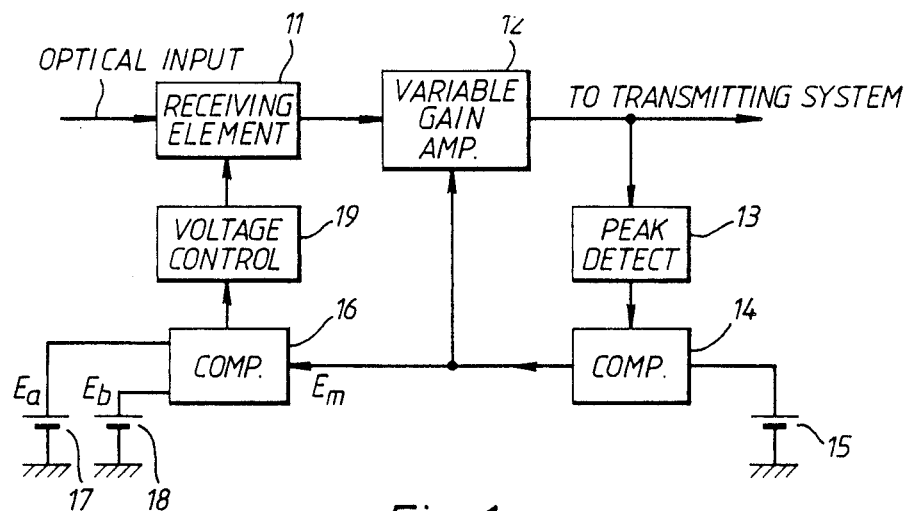
FIG. 1 is a block diagram of an apparatus according to one embodiment of the invention.

Referring to the accompanying drawings, an embodiment of the present invention will be described. The same numerals are applied to similar elements in the drawings, and therefore detailed descriptions thereof are not repeated.

As shown in FIG. 1, an automatic gain control apparatus includes an optical receiving element 11 such as an avalanche photodiode (APD) which generates electrical signals corresponding to multiplied received optical signals. The multiplication factor of optical receiving element 11 is controlled by a bias signal. A variable gain amplifier 12 amplifies output signals from optical receiving element 11. The amplified signals from variable gain amplifier 12 are transmitted to a transmitting system and are also supplied to a peak detector 13 which detects peak levels of the amplified signals. A first comparing circuit 14 compares an output voltage from a voltage source 15 for producing an output voltage Em corresponding to the difference between a peak detected voltage and the reference voltage. Output signals from first comparing circuit 14 are supplied to variable gain amplifier 12 and to a second comparing circuit 16 which compares the output voltage Em from first comparing circuit 14 with first and second predetermined voltages Eb and Ea.

Predetermined voltages Ea and Eb are generated by constant voltage sources 17 and 18. First predetermined voltage Eb is less than second predetermined voltage Ea(Ea>Eb). When output voltage Em from first comparing circuit 14 is less than or equal to first predetermined voltage Eb(Em≦Eb), second comparing circuit 16 generates first selecting signal which is supplied to voltage control circuit 19. In response to the first selecting signal, voltage control circuit 19 generates a first bias signal for setting the multiplication factor of optical receiving element 11 to an optimum value Mb in which a signal to noise ratio of a receiving system in an optical repeater becomes maximum. When output voltage Em from first comparing circuit 14 is greater than or equal to second predetermined voltage Ea(Ea≦Em), second comparing circuit 16 generates second selecting signal which is supplied to voltage control circuit 19. In response to the second selecting signal, voltage control circuit 19 generates a second bias signal for setting the multiplication factor of optical receiving element 11 to an optimum value Ma in which the signal to noise ratio of the receiving system becomes maximum. When output voltage Em is greater than first predetermined value Eb and less than second predetermined value Ea(Eb<Em<Ea), second comparing circuit 16 generates third selecting signal which is supplied to voltage control circuit 19. In response to the third selecting signal, voltage control circuit 19 generates a third bias signal which varies between both values corresponding to the first and second bias signals. This prevents the deterioration of the signal to noise ratio.

Figure 2:
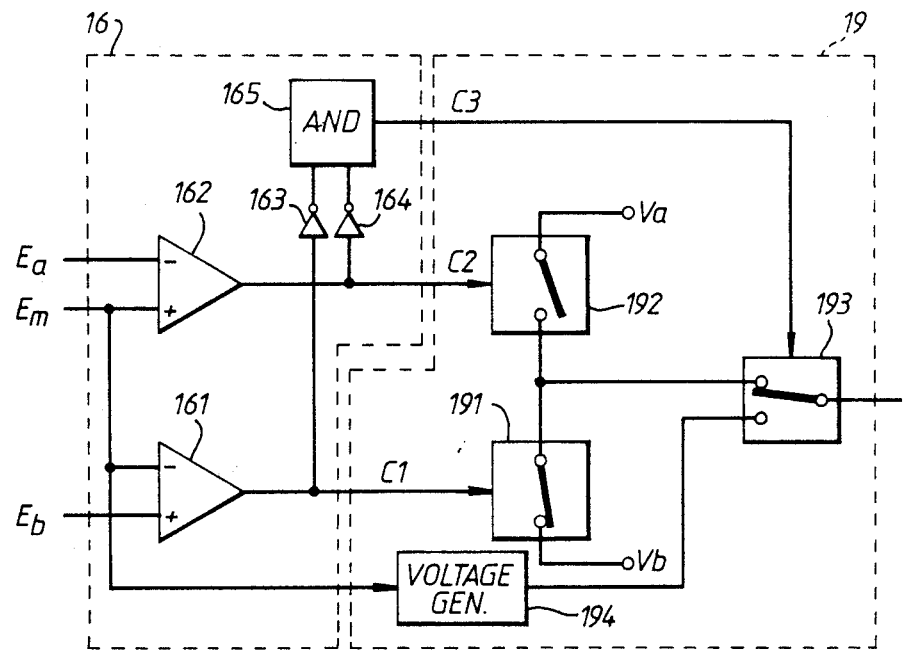
FIG. 2 is a detailed block diagram of a second comparing circuit and a voltage control circuit in the apparatus shown in FIG. 1.

FIG. 2 shows a detailed block diagram of second comparing circuit 16 and voltage control circuit 19 shown in FIG. 1. Second comparing circuit 16 includes two comparators 161 and 162. Comparator 161 generates a high level active signal as a first selecting signal C1 when output voltage Em is less than or equal to first predetermined voltage Eb(Em≦Eb). A first switching means 191 in voltage control circuit 19 is responsive to the output of comparator 161, and is turned ON by first selecting signal C1 being active. Comparator 162 generates a low level signal when Em≦Eb. Thus, a second switching means 192 is turned OFF by a low (inactive) output signal from comparator 162. Output signals from comparators 161 and 162 are also supplied to an AND circuit 165 through inverters 163 and 164.

Output signal from AND circuit 165 has a low level unless both inputs are high (Ea≦Em≦Eb). Thus, when Em≦Eb, C3 is low, causing a third switching means 193 to select a first bias voltage Vb to supply it to Optical receiving element 11.

The multiplication factor of optical receiving element 11 is set to value Mb by voltage Vb. Comparator 162 generates a high level signal as a second selecting signal C2 when output voltage Em is greater than or equal to second predetermined voltage Ea(Ea≦Em). Second switching means 192 is turned ON by second selecting signal C2. Comparator 161 generates a low level signal when Ea≦Em. Thus, second switching means 191 is turned OFF by an output signal from comparator 161. At that time, the output signal from AND circuit 163 still has a low level. Thus, third selecting means 193 selects the second bias voltage Va to supply it to optical receiving element 11. The multiplication factor of optical receiving element 11 is set to value Ma by voltage Va. Comparators 161 and 162 generate low level signals when output voltage Em is greater than value Eb and less than value Ea(Eb<Em<Ea). AND circuit 165 produces a high level signal as a third selecting signal C3.

Voltage generator 194 includes an amplifier which produces a change of output voltage corresponding to a change of voltage Em. Third switching means 193 selects the output signal from voltage generator 194 by third selecting signal to produce a third bias voltage which varies between both bias voltages Va and Vb when C3 is high.

A gain of variable gain amplifier 12 is therefore controlled in accordance with levels of the received optical signals in optical receiving element 11. When the peak detected signal from peak detector 13 corresponding to the received optical signal has a low level, variable gain amplifier 12 is controlled so that the gain becomes great by the output signal from first comparing circuit 14.

When the peak detected signal has a high level, variable gain amplifier 12 is controlled so that the gain becomes small. According to such a control of the multiplication factor of optical receiving element 11 and the gain of variable gain amplifier 12, the output amplitude from variable gain amplifier 12 is controlled to be kept constant.

Figure 3:
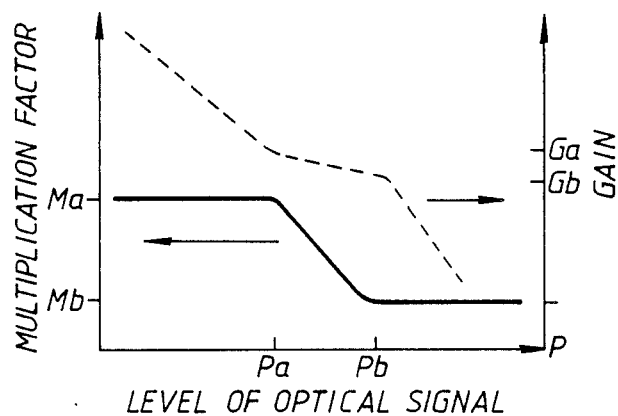
FIG. 3 is a graph which shows characteristics of the apparatus shown in FIG. 1.

FIG. 3 shows the relation between levels of received optical signals, the multiplication factor shown by a continuous line and the gain shown by a dashed line.

A level Pa of the received optical signal corresponds to output voltage Em from first comparing circuit 14 equal to second predetermined voltage Ea. A level Pb of the received optical signal corresponding to output voltage Em from first comparing circuit 14 equal to first predetermined voltage Eb. When level P of the received optical signal is less than or equal to level Pa ($P \leq Pa$), the multiplication factor is kept constant at the optimum value Ma, and the gain changes in accordance with level P of the received optical signal. When level P of the received optical signal is between level Pa and Pb ($Pa < P < Pb$), the multiplication factor decreases from value Ma to Mb so that the signal to noise ratio does not deteriorate. The gain also decreases from value Ga to Gb, at a smaller rate of change than that when $P \leq Pa$. When level P of the received optical signal is greater than or equal to level Pb ($Pb \leq P$), the multiplication factor is also kept constant at optimum value Mb, and the gain decreases with a large rate of change as level P increases.

Thus, when level P of the received optical signal is low, the deterioration of the signal to noise ratio can be prevented due to the setting of the optimum multiplication factor. Also, the output amplitude from variable gain amplifier 12 can be kept constant, regardless of the level of the received optical signal, by controlling the large gain. When the level P is between levels Pa and Pb, a dynamic range can be broadened because the multiplication factor is changeable. When level P of the received optical signal becomes greater than level Pb, deterioration of the signal to noise ratio can be prevented because the multiplication factor is set to the optimum value. Also, the output amplitude from variable gain amplifier 12 is kept constant because the gain decreases in accordance with a level of an input signal.

Figure 4:
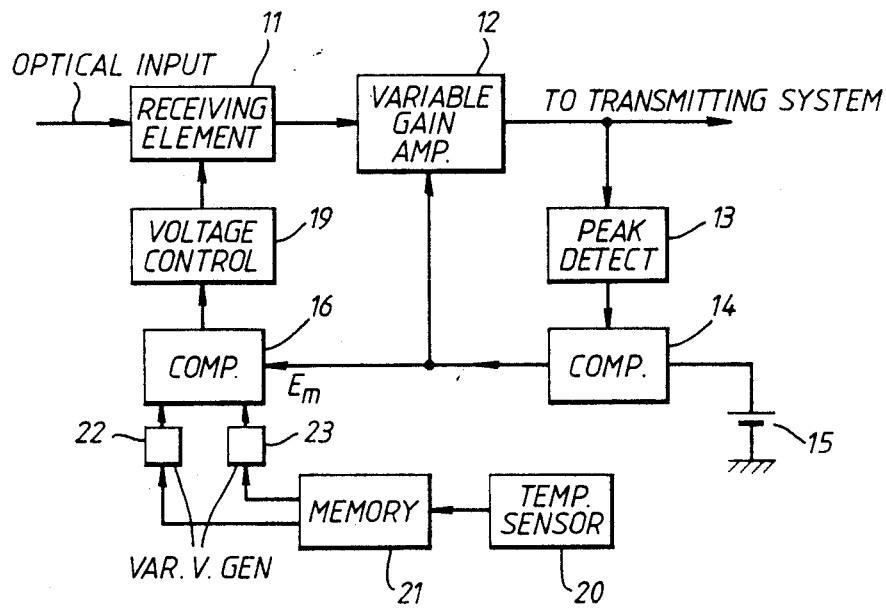
FIG. 4 is a block diagram of an apparatus according to another embodiment of this invention.
Figure 5:
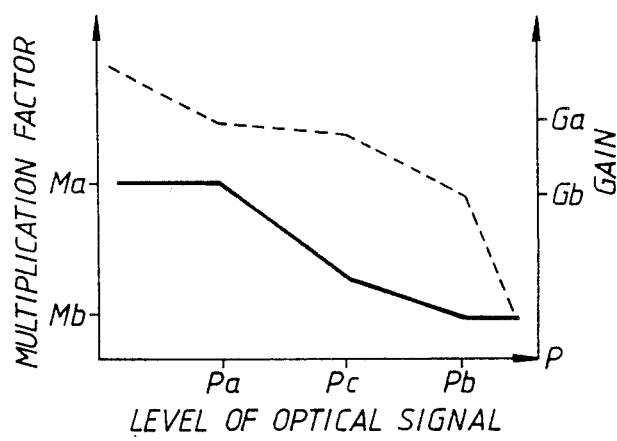
FIG. 5 shows characteristics of an apparatus according to still another embodiment of this invention.
Figure 6:
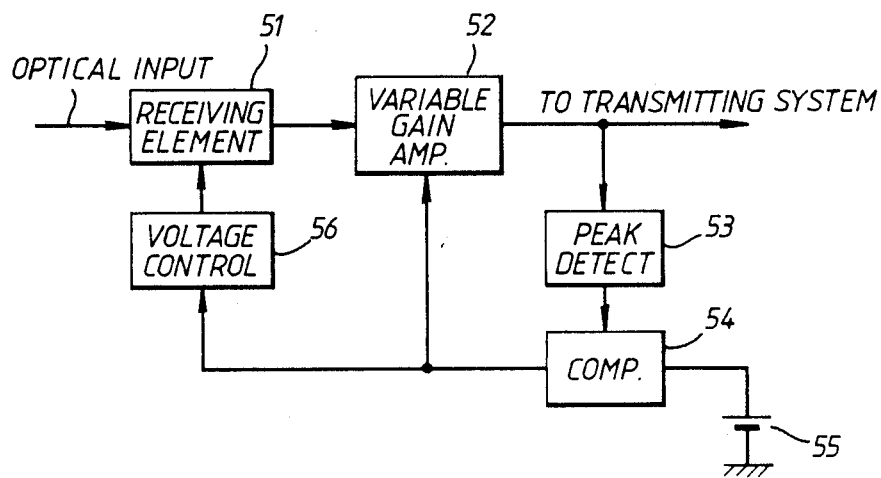
FIG. 6 is a block diagram of a known automatic gain control apparatus.
Figure 7:
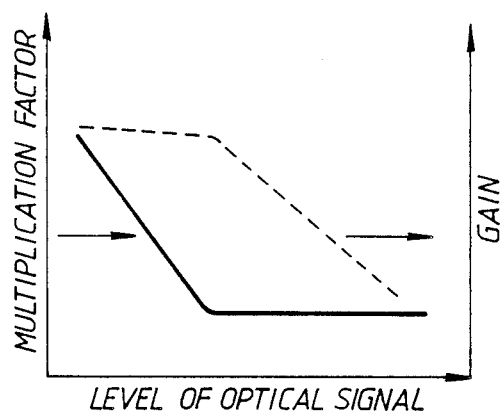
FIG. 7 shows characteristics of the apparatus shown in FIG. 6.
Figure 8:
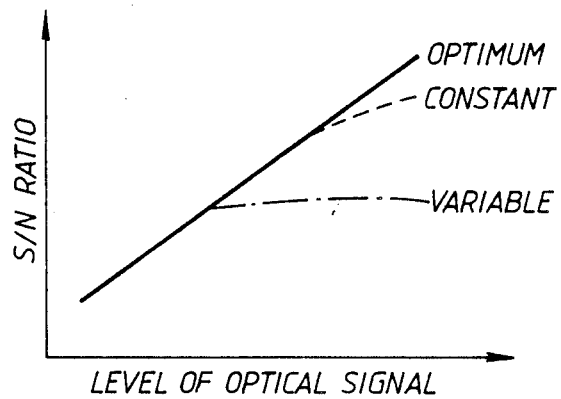
FIG. 8 shows a relation between a level of a received optical signal and a signal to noise ratio which depends on a multiplication factor of a optical receiving element.

A second embodiment replaces constant voltage sources 17 and 18 with variable voltage generators 22 and 23 shown in FIG. 4. The apparatus includes a sensor 20 for detecting ambient temperature, and a memory 21, such as a read only memory, for storing voltage data corresponding to the ambient temperature. The voltage data are read from memory 21 by using the detected temperature data from sensor 20 to address the memory. The voltage data are supplied to variable voltage generators 22 and 23. First and second predetermined voltages Eb and Ea corresponding to the current temperature are generated. The temperature data can be also supplied to voltage control circuit 19 for setting the multiplication factor in optical receiving element 11 to a defined value corresponding to the change of temperature. Moreover, as shown in FIG. 5, when level P increases, the multiplication factor can be controlled to gradually approach optimum value Mb by degrees, to avoid a rapid change of the multiplication factor. In this case, a third predetermined value corresponding to level Pc of the received optical signal may be supplied to second comparator 16. The multiplication factor is shown by a continuous line. The gain for keeping the output amplitude from variable gain amplifier 12 constant is shown by a dashed line.

According to these embodiments, it is possible to prevent the deterioration of the dynamic range and the signal to noise ratio in the receiving system of the optical repeater when the level of the received optical signal increases. Also, it is possible to keep the constant output amplitude from the gain amplifier.

Thus, the transmission characteristics of the optical signals is stabilized and the reliability is improved.

Therefore, it is possible with the present invention to provide an improved automatic gain control apparatus that is suitable for such as an optical signal transmission device.

Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed is:

1. An apparatus for automatically controlling gain, comprising:
   receiving means for receiving optical signals, and for generating electrical signals corresponding to the received optical signals using an adjustable multiplication factor which depends on an applied bias signal;
   variable gain control means for amplifying the electrical signals from the receiving means by an adjustable gain;
   difference determining means for determining a difference between an electrical signal from the gain control means and a reference signal; and
   producing means, responsive to a determined signal indicative of said difference from the difference determining means, for controlling a gain of said variable gain control means and for producing the bias signal such that:
   (1) when a value of the determined signal is less than or equal to a first predetermined value, the multiplication factor is set to a first constant value, and said gain of the variable gain control means is controlled corresponding to a level of said received optical signals,
   (2) when a value of the determined signal is greater than or equal to a second predetermined value greater than said first predetermined value, the multiplication factor is set to a second constant value less than said first constant value and said gain of the variable gain control means is controlled corresponding to the level of said received optical signals, and
   (3) when a value of said determined signal is between said first and second predetermined values, said bias signal is controlled corresponding to said difference, and said gain is controlled corresponding to the level of said received optical signals.

2. The apparatus of claim 1, wherein the receiving means includes an avalanche photodiode for converting the received optical signals into the electrical signals.

3. The apparatus of claim 1, wherein the variable gain control means includes:
   means for amplifying the electrical signals; and
   means for detecting a peak level of an output signal from the amplifying means.

4. The apparatus of claim 1, wherein the producing means includes signal source means for generating first and second predetermined signals which have levels corresponding respectively to the first and second predetermined values;
   comparing means for producing a selecting signal by comparing the determined signal with the first and second predetermined signals; and
   generating means for generating the bias signal corresponding to the selecting signal.

5. The apparatus of claim 1, wherein the producing means includes means for changing the multiplication factor between the first and second values as a function of the determined signal when the value of the determined signal is greater than the first predetermined value and less than the second predetermined value.

6. The apparatus of claim 1, wherein the producing means includes means for controlling the gain of the variable gain control means so that output amplitude from the control means so that an output amplitude from the control means becomes constant.

7. The apparatus of claim 1, wherein the producing means includes means for setting the multiplication factor to different optimum values in accordance with different levels of the received optical signal.

8. An apparatus for automatically controlling gain, comprising:
   receiving means for receiving optical signals, and for generating electrical signals corresponding to the received optical signals using an adjustable multiplication factor which depends on an applied bias signal;
   variable gain control means for amplifying the electrical signals from the receiving means by an adjustable gain;
   difference determining means for determining a difference between an electrical signal from the gain control means and a reference signal, and for controlling a gain of the variable gain control means corresponding to the difference;
   producing means, responsive to a determined signal indicative of said difference from the difference determining means, for producing the bias signal to set the multiplication factor to a first value when a value of the determined signal is less than or equal to a first predetermined value, and to set the multiplication factor to a second value, which is greater than the first value, when a value of the determined signal greater than or equal to a second predetermined value;
   memory means for storing predetermined data corresponding to various ambient temperatures;
   detecting means for detecting an ambient temperature and applying the ambient temperature to the memory means to read out data corresponding thereto; and
   generating means responsive to data for generating signals corresponding to the first and second predetermined values.

* * * * *